US012746606B2

(12) United States Patent
Wanin

(10) Patent No.: US 12,746,606 B2
(45) Date of Patent: Sep. 29, 2026

(54) DRILLING GRID, DRILL RIG AND METHOD FOR SUPERVISING AT LEAST ONE OPERATION FOR DRILLING AN AIRCRAFT STRUCTURAL PART

(71) Applicant: PV TOOL FRANCE, Montesson (FR)

(72) Inventor: Etienne Wanin, Chatou (FR)

(73) Assignee: PV TOOL FRANCE, Montesson (FR)

( * ) Notice: Subject to any disclaimer, the term of this patent is extended or adjusted under 35 U.S.C. 154(b) by 775 days.

(21) Appl. No.: 17/925,668

(22) PCT Filed: May 19, 2021

(86) PCT No.: PCT/FR2021/050882

§ 371 (c)(1),
(2) Date: Nov. 16, 2022

(87) PCT Pub. No.: WO2021/234287

PCT Pub. Date: Nov. 25, 2021

(65) Prior Publication Data

US 2023/0191506 A1 Jun. 22, 2023

(30) Foreign Application Priority Data

May 20, 2020 (FR) .................................... 2005387

(51) Int. Cl.
*B23B 49/02* (2006.01)
*B23B 47/28* (2006.01)

(52) U.S. Cl.
CPC .......... *B23B 47/28* (2013.01); *B23B 2215/04* (2013.01); *B23B 2270/483* (2013.01)

(58) Field of Classification Search
CPC ................ B23B 47/28; B23B 2215/04; B23B 2270/483; B23B 49/02
USPC .......................................... 408/115; 700/160
See application file for complete search history.

(56) References Cited

U.S. PATENT DOCUMENTS

2008/0047333 A1 2/2008 Turrini et al.
2008/0267728 A1 10/2008 Eriksson et al.
2016/0199922 A1 7/2016 Andersson et al.
2019/0029697 A1 * 1/2019 Anderson .......... A61B 17/1622
2019/0150290 A1 * 5/2019 Jara Rodelgo .......... B23B 49/02 33/562

(Continued)

FOREIGN PATENT DOCUMENTS

EP 3789142 A1 * 3/2021 ............. B23B 49/02
WO WO-2005120752 A1 * 12/2005 ........... B23B 35/005

OTHER PUBLICATIONS

WO-2005120752-A1 PE2E translation (Year: 2005).*

*Primary Examiner* — Paul B Yanchus, III
*Assistant Examiner* — Michael V Farina
(74) *Attorney, Agent, or Firm* — DUANE MORRIS LLP; Gregory M. Lefkowitz; Daniel J. Tarr

(57) ABSTRACT

A drilling grid includes a main body designed to be attached to an aircraft structural part and having through-holes for positioning a machine for drilling the aircraft structural part. The drilling grid includes a wireless communication device configured to communicate with a supervision system and a data processing unit designed to send to the supervision system, via the wireless communication device, information relating to the drilling grid and/or the drilling machine positioned in one of the positioning holes.

7 Claims, 4 Drawing Sheets

(56) References Cited

U.S. PATENT DOCUMENTS

| | | | | |
|---|---|---|---|---|
| 2020/0290169 | A1 * | 9/2020 | Ozeki | B25J 9/1633 |
| 2021/0187676 | A1 * | 6/2021 | Schroeder | B64F 5/10 |

* cited by examiner

[Fig. 2]
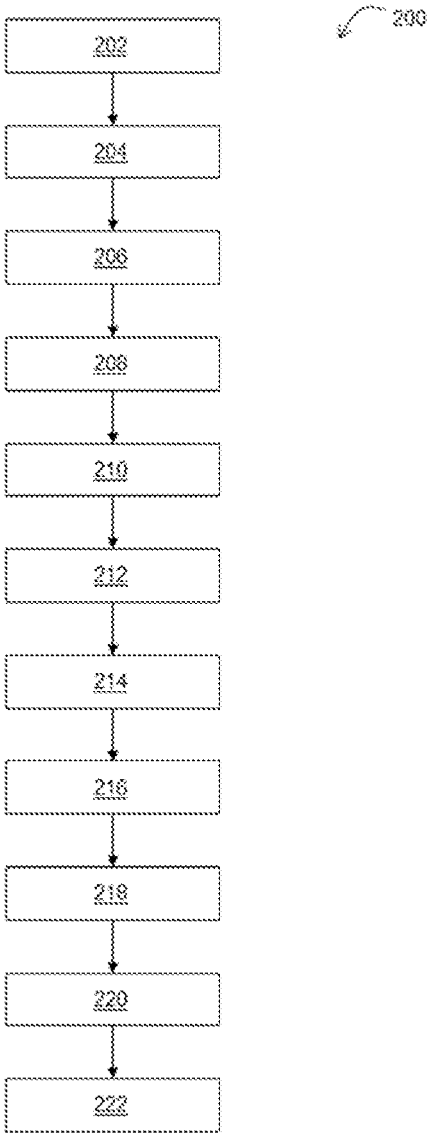

[Fig. 3]
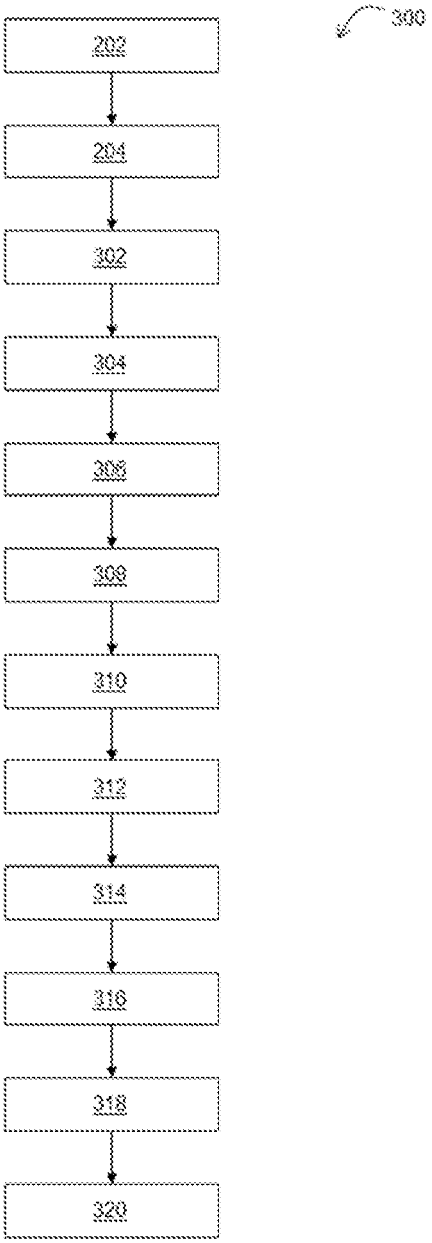

[Fig. 4]
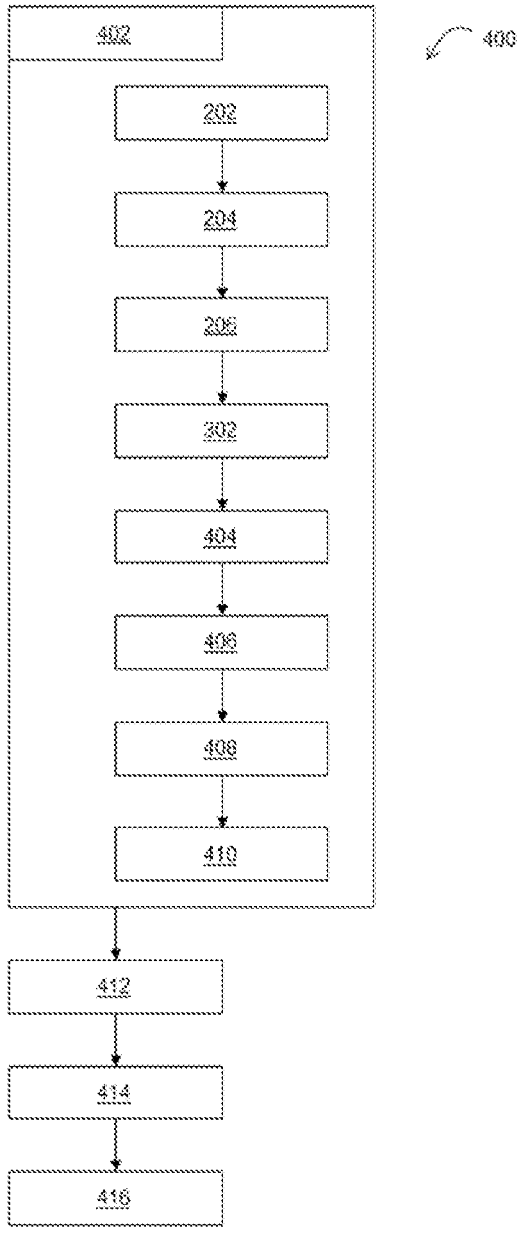

DRILLING GRID, DRILL RIG AND METHOD FOR SUPERVISING AT LEAST ONE OPERATION FOR DRILLING AN AIRCRAFT STRUCTURAL PART

CROSS-REFERENCE TO RELATED APPLICATIONS

This application is a § 371 national stage entry of International Application No. PCT/FR2021/050882, filed May 19, 2021, which claims priority to French Patent Application No. FR2005387, filed May 20, 2020, the entire contents of which are incorporated herein by reference.

TECHNICAL FIELD

The present invention relates to a drilling grid, a drilling installation and a method for supervising at least one operation for drilling an aeronautical structural part.

BACKGROUND

It is known from the prior art that a drilling grid comprises a main body designed to be attached to an aeronautical structural part and has through holes for positioning a drilling machine for the aeronautical structural part.

It may be desirable to provide a drilling grid to allow to improve the supervision of the drilling operations.

SUMMARY

A drilling grid is therefore proposed, comprising a main body designed to be attached to an aeronautical structural part and having through holes for positioning a drilling machine for the aeronautical structural part; characterised in that it further comprises: a wireless communication device designed to communicate with a supervision system; and a data processing unit designed to send to the supervision system, via the wireless communication device, information relating to the drilling grid and/or a drilling machine positioned in one of the positioning holes.

Thus, thanks to the invention, the information relating to each drilling grid and/or each drilling machine positioned in one of the positioning holes of the drilling grid or grids can be centralised in a single supervision system, allowing to improve the supervision of the drilling operations.

Optionally, the drilling grid further comprises a memory in which an identifier of the drilling grid is stored, the data processing unit is designed to detect the presence of the drilling machine and the information sent to the supervision system comprises an indication of the presence of the drilling machine and the identifier.

Also optionally, the drilling grid further comprises wireless communication devices respectively associated with the positioning holes, each for communicating with the drilling machine positioned in the associated positioning hole, the data processing unit is further designed to receive torque and/or thrust data from a cutting tool of the drilling machine, via the wireless communication device associated with the positioning hole in which the drilling machine is positioned, and the information sent to the supervision system comprises these torque and/or thrust data.

Also optionally, the data processing unit is also designed to determine at least one advancement instant of the drilling operation and the information sent to the supervision system comprises the determined advancement instant or instants.

A drilling installation is also proposed, comprising a drilling grid according to the invention; and the supervision system, the latter being designed to obtain, in response to receiving the presence of the drilling machine, a geolocation of the drilling grid identified by the received identifier and to compare the obtained geolocation with a predefined geographical area where the drilling grid is to be located.

A drilling installation is also proposed, comprising a drilling grid according to the invention; and the supervision system, the latter being designed to estimate an end of life of the cutting tool from the received torque and/or thrust data, to determine a desired receipt date for a replacement cutting tool from the estimated end of life of the cutting tool and to send a command for the replacement cutting tool for the desired receipt date to a command management system A drilling installation is also proposed, comprising a drilling grid according to the invention; and the supervision system, the latter being designed to identify one or more blocking operations from the advancement instants received.

BRIEF DESCRIPTION OF THE FIGURES

The invention will be better understood with the aid of the following description, given only by way of example and made with reference to the attached drawings in which:

FIG. 2 is a block diagram illustrating the steps of a method for supervising the drilling of the aeronautical structural parts, according to one embodiment of the invention, FIG. 3 is a block diagram illustrating the steps of a method for supervising the drilling of the aeronautical structural parts, according to another embodiment of the invention, and FIG. 4 is a block diagram illustrating the steps of a method for supervising the drilling of the aeronautical structural parts, according to another embodiment of the invention.

DETAILED DESCRIPTION

Figure 1:
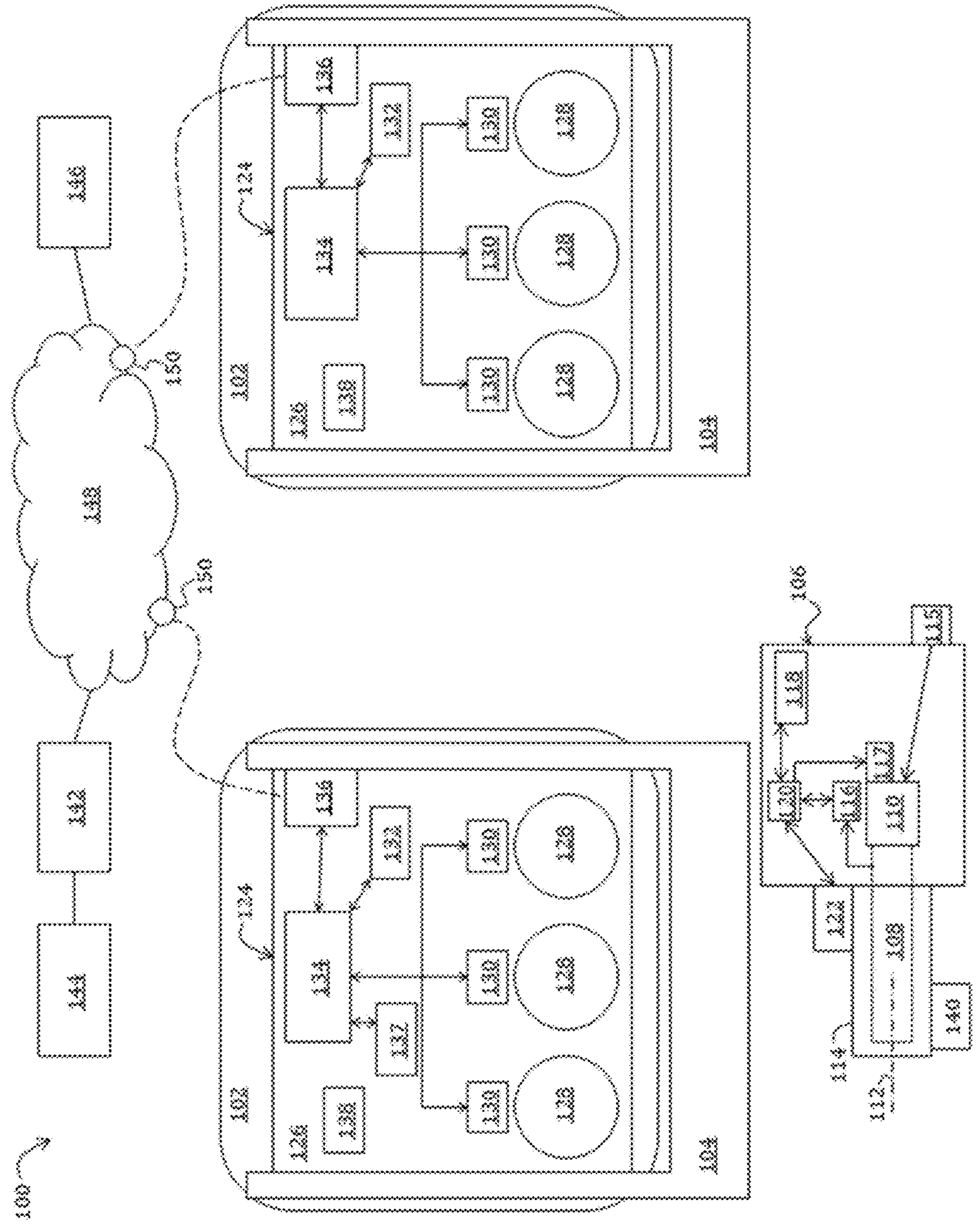
FIG. 1 is a simplified schematic view of an installation for drilling aeronautical structural parts, according to an embodiment of the invention.

With reference to FIG. 1, a drilling installation 100 for aeronautical structural parts 102, implementing the invention, will now be described.

The installation 100 comprises a number of workstations 104 designed to respectively receive the aeronautical structural parts 102 intended to be drilled.

To drill the aeronautical structural parts 102, the installation 100 further comprises at least one drilling machine 106.

In the example described, the drilling machine 106 is semi-automatically operated, i.e. the drilling machine 106 is designed to be positioned by the force of an operator (human) and the drilling phase is carried out by the drilling machine 106 without using the force of an operator (human).

The drilling machine 106 comprises a cutting tool 108 and a drive system 110 for the cutting tool 108. The drive system 110 is designed to rotate the cutting tool 108 about an axis 112 and to automatically advance and retract it along this axis 112. The drive system 110 comprises for example an electric and/or pneumatic motor. The drilling machine 106 further comprises a guiding canon 114 for the cutting tool 108, extending along the axis 112.

The drilling machine 106 further comprises a button 115 designed to be operated by a user of the drilling machine 106 to start the drive system 110.

The drilling machine 106 further comprises a device 116 for measuring a thrust and/or a torque of the cutting tool 108.

The drilling machine 106 further comprises an inhibiting device 117 for the drive system 110 designed, when activated, to inhibit the operation of the drive system 110. For example, the inhibiting device 117 is designed to prevent a power supply to the drive system 110.

The drilling machine 106 further comprises a memory 118 in which an identifier of the drilling machine 106 (hereinafter referred to as the "machine identifier") is stored, and a data processing unit 120 designed to carry out the actions of the drilling machine 106 which will be detailed later, with reference to FIGS. 2 to 4.

The drilling machine 106 furthermore comprises a short-range wireless communication device 122, for example arranged on the guiding canon 114. The short-range wireless communication device 122 has, for example, a range of at most five centimetres.

In order to correctly position the drilling machine 106 with respect to the aeronautical structural parts 102, the installation 100 further comprises drilling grids 124. Each drilling grid 124 is designed to be selectively attached to each of the workstations 104 in front of the aeronautical structural part 102 received at that workstation 104. Thus, in the example described, each drilling grid 124 is attached to the aeronautical structural part 102 through the workstation 104.

The drilling grid 124 firstly comprises a main body 126 with through holes 128 for positioning the drilling machines 106. Each positioning hole 128 is thus designed to receive the guiding canon 114 of the drilling machine 106.

The drilling grid 124 further comprises a memory 132 in which an identifier of the drilling grid 124 (hereinafter referred to as "grid identifier") is stored, and a data processing unit 134 designed to carry out the actions of the drilling grid 124 which will be detailed later, with reference to FIGS. 2 to 4.

The drilling grid 124 further comprises short-range wireless communication devices 130 respectively associated with the positioning holes 128. Each short-range wireless communication device 130 is thus positioned in close proximity to its associated positioning hole 128. "In close proximity" means, for example, that each short-range wireless communication device 130 is closer to its associated positioning hole 128 than to the other positioning holes 128. The short-range wireless communication device 130 has, for example, a range of at most five centimetres.

Thus, the data processing unit 134 of the drilling grid 124 and the processing unit 120 of the drilling machine 106 are capable of communicating with each other via the short-range wireless communication interface 130 associated with the positioning hole 128 in which the drilling machine 106 is positioned and the short-range wireless communication interface 122 of the drilling machine 106.

The drilling grid 124 further comprises a long-range wireless communication device 136 preferably having a much greater range than the short-range wireless communication device 130, for example at least ten meters, for example between ten and one hundred meters.

To power its elements, the drilling grid 124 further comprises a self-contained battery 138, designed to be recharged for example when the drilling grid 124 is not in use. Thus, the drilling grid 124 does not need to be connected to a power supply cable, allowing it to be easily transported from one workstation 104 to another.

As can be clearly seen in FIG. 1, the elements 130, 132, 134, 136 and 138 are attached to the body 126 of the drilling grid 124.

To ensure that the drilling machine 106 is properly attached to the drilling grid 124, a locking system 140 is preferably provided on the drilling machine 106 and/or on the drilling grid 124. This locking system 140 is for example one of the following four systems: ¼ turn system, Concentric-Collar system, C-Clamping system and DASA system.

Furthermore, the installation 100 comprises a supervision system 142 and a control screen 144 on which the supervision system 142 is designed to display information.

The installation 100 further comprises a command management system 146.

The installation 100 further comprises an interconnection network 148 equipped with wireless communication terminals 150, for example Wi-Fi terminals. The interconnection network 148 is designed to allow a communication between the elements connected to it. These elements comprise in particular the supervision system 142, the command management system 146 and the drilling grids 124.

The installation 100 optionally further comprises a geolocation device 137 designed to geolocate the drilling grid 124 in the space. The geolocation device 137 comprises, for example, a GPS (Global Positioning System) module which is, for example, part of the drilling grid 124. Alternatively or additionally, the geolocation device 137 comprises a module for positioning via the interconnection network 101, for example provided in the supervision system 142. This positioning module is then designed to geolocate the drilling grid 124 in the space by triangulating signals exchanged between the long-range wireless communication device 136 of the drilling grid 124 and at least three of the wireless terminals 103 of the interconnection network 101.

With reference to FIG. 2, a first example of a method 200 for supervising the drilling of aeronautical structural parts 102, implementing the invention, will now be described.

In a step 202, one of the aeronautical structural parts 102 is attached to one of the workstations 104, and one of the drilling grids 124 is attached to that workstation 104 in front of the aeronautical structural part 102.

In a step 204, the drilling machine 106 is coupled to the drilling grid 124. For this purpose, its guiding canon 114 is first positioned in one of the positioning holes 128 and the drilling machine 106 is locked to the drilling grid 124 by the locking device 140.

In a step 206, the drilling grid 124 detects the presence of the drilling machine 124. For example, this detection is carried out by the two short-range wireless communication devices 130, 122 being within range of each other and entering into communication with each other.

In a step 208, the drilling grid 124 transmits information relating to the drilling grid 124 and/or the drilling machine 106 to the supervision system 142 via the long-range wireless communication device 136. In the example described, the drilling grid 124 transmits an indication of the presence of the drilling machine 106 and the grid identifier stored in the memory 132 to the supervision system 142 via the long-range wireless communication device 136.

In a step 210, the supervision system 142 receives the presence indication from the drilling machine 106 and the grid identifier.

In a step 212, the supervision system 142 obtains a geolocation of the drilling grid 124 identified by the received identifier. For example, the supervision system 142 itself determines the geolocation by triangulating signals exchanged between the long-range wireless communication device 136 of the drilling grid 124 and at least three of the wireless terminals 150 of the interconnection network 148. Alternatively or additionally, the supervision system 142 receives, together with the presence indication and the grid identifier, the geolocation carried out by the geolocation device 137 of the drilling grid 124.

In a step 214, the supervision system 142 compares the geolocation of the drilling grid 124 with a predefined geographic area where the drilling grid 124 is to be located. For example, each workstation 104 is associated with a predefined geographical area in which it is located. In addition, the supervision system 142 has access to a schedule listing for each workstation 104 successive time intervals when that workstation is to be used and, for each time interval, the drilling grid 124 to be used at that workstation 104. Thus, the supervision system 142 determines the workstation 104 where the drilling grid 124 is to be located in the current time interval and the predefined geographical area compared to the received geolocation is that associated with that workstation 104.

If the geolocation of the drilling grid 124 is outside the predefined geographical area, the supervision system 142 will, for example, in a step 216, emits an alert message, for example by displaying it on the monitoring screen 144.

Alternatively or additionally, the supervision system 142 transmits, for example, in a step 218, a deactivation message to the drilling grid 124.

In a step 220, the drilling grid 124 then receives this deactivation message and transmits it, via the short-range wireless communication device 130, to the drilling machine 106.

In a step 222, the drilling machine 106 receives the deactivation message and activates the inhibiting device 117 so that pressing the button 115 does not start the drive system 110.

With reference to FIG. 3, a second example of a method 300 for supervising the drilling of aeronautical structural parts 102, implementing the invention, will now be described.

The method 300 first comprises the steps 202 (attaching to the workstation 104) and 204 (coupling to the drilling machine 106) described above.

In a step 302, a user activates the button 115 and the drilling machine 106 begins the drilling job.

During the drilling operation, the measuring device 116 of the drilling machine 106 carries out torque and/or thrust measurements of the cutting tool 108 in a step 304, from which the drilling machine 106 determines torque and/or thrust data. The torque and/or thrust data comprise, for example, the measurements provided by the measuring device 116 and/or data derived from these measurements.

In a step 306, the drilling machine 106 transmits the torque and/or thrust data to the drilling grid 124.

In a step 308, the drilling grid 124 receives the torque and/or thrust data and transmits information relating to the drilling grid 124 and/or the drilling machine 106 to the supervision system 142 via the long-range wireless communication device 136. In the example described, the drilling grid 124 transmits torque and/or thrust data to the supervision system 142.

In a step 310, the supervision system 142 receives the torque and/or thrust data and estimates an end of life of the cutting tool 108 from the received torque and/or thrust data.

In a step 312, the supervision system 142 determines a desired receipt date for a replacement cutting tool based on the estimated end of life of the cutting tool 108. In the example described, the step 312 comprises the following steps 314 and 316.

In a step 314, the supervision system 142 consults a list of possible future cutting tool procurement dates and compares the estimated end of life of the cutting tool 108 with the procurement dates in the list.

In a step 316, the supervision system 142 selects the procurement date directly preceding the estimated end of life of the cutting tool 108, i.e. the last procurement date before the estimated end of life of the cutting tool 108. If the list does not comprise any procurement date until the estimated end of life of the cutting tool 108, the supervision system 142 selects, for example, the first procurement date in the list following the estimated end of life of the cutting tool 108.

In a step 318, the supervision system 142 sends a command for the replacement cutting tool for the desired receipt date to the command management system 146.

In a step 320, on the desired receipt date, the replacement cutting tool is received and the cutting tool 108 is replaced with the replacement cutting tool in the drilling machine 106.

With reference to FIG. 4, a third example of a method 400 for supervising the drilling of aeronautical structural parts 102, implementing the invention, will now be described.

In a step 402, several drilling operations are carried out. Each drilling operation comprises the following steps.

The steps 202 (attaching to the workstation 104), 204 (coupling the drilling machine 106) and 206 (detecting the presence of the drilling machine 106) described above are carried out. The previously described drilling start step 302 is then carried out.

In a step 404, the drilling machine 106 completes the drilling of the aeronautical structural part 102.

In a step 406, the drilling machine 106 is separated from the drilling grid 124 by an operator (human).

In parallel to the previous steps, in a step 408, the drilling grid 124 determines at least one advancement instant of the drilling operation, for example one or more of: a positioning instant, a drilling start instant, a drilling end instant and a separation instant.

The instant of positioning of the drilling machine 106 on the drilling grid 124 is, for example, the time at which the presence of the drilling machine 106 was detected. The instant of separation of the drilling machine 106 from the drilling grid 124 is, for example, when the communication between the short-range wireless communication devices 122, 130 is interrupted due to the distance between them.

In a step 410, the drilling grid 124 sends information relating to the drilling grid 124 and/or the drilling machine 106 to the supervision system 142 via the long-range wireless communication device 136. In the example described, the drilling grid 124 sends the determined advancement instant or instants to the supervision system 142.

Following step 402, in a step 412, the supervision system 142 receives the drilling advancement instants sent by the drilling grids 124.

In a step 414, the supervision system 142 identifies one or more blocking operations from the received advancement instants. For this purpose, the supervision system 142 compares, for example, at least one defined duration from at least one received advancement instant with a predefined duration.

For example, the supervision system 142 determines a changeover duration of the drilling machine 106, defined as, for example, the time between the instant of separation of the drilling machine 106 from one of the positioning holes 128 of the drilling grid 124 and the instant of positioning of the drilling machine 106 in another positioning hole 128, of the same drilling grid 124 or of another drilling grid 124.

As another example, the supervision system 142 determines a drilling duration, defined for example as the time between the drilling start instant and the drilling end instant.

In a step 416, the supervision system 142 automatically updates an operator (human) and drilling machine 106 assignment table to assign more operators (humans) and/or at least one additional drilling machine 106 and/or a drilling machine 106 different than at least one of that initially scheduled to the drilling operations.

For example, when the drilling machine 106 changeover duration is longer than the predefined changeover duration, this may indicate a lack of personnel to displace the drilling machines 106 and the supervision system 142 automatically updates the assignment table to assign more operators (human).

Again, for example, when the drilling duration is greater than the predefined duration for drilling, this may indicate that the drilling machine 106 is not suitable for this operation and the supervision system 142 automatically updates the allocation table to assign another drilling machine 106 to this drilling operation. Alternatively or additionally, the supervision system 142 automatically updates the assignment table to assign more drilling machines 106 to the drilling operations, so that more drilling operations can be carried out in parallel and the detected high drilling duration is less blocking.

It is clear that a drilling grid such as the one described above allow to improve the supervision of the drilling operations.

It will be further noted that the invention is not limited to the embodiments described above. Indeed, it will be apparent to the person skilled in the art that various modifications can be made to the above-described embodiments, in the light of the teaching just disclosed.

For example, the methods in FIGS. 2, 3 and 4 could be carried out at the same time, in any combination.

In addition, each of the data processing units comprises a computer system and comprises, for example, a microprocessor and an associated memory (such as a main memory) into which a computer program is intended to be loaded, the computer program containing computer program instructions designed to be executed by the processing unit. Thus, the functions implemented by the data processing unit are implemented in the example described in the computer program as software bricks.

Alternatively, all or part of these software bricks could be implemented as hardware bricks, i.e. in the form of an electronic circuit, for example micro-wired, not involving a computer program.

The terms used in the claims are not to be interpreted as limiting the invention to the embodiments disclosed in the present description, but are to be interpreted to include all equivalents the anticipation of which is within the reach of the person skilled in the art by applying his or her general knowledge to the implementation of the teaching just disclosed.

The invention claimed is:

1. A drilling grid comprising:

a main body designed to be attached to an aeronautical structural part and having through holes for positioning a machine for drilling the aeronautical structural part;

wherein it further comprises:

a long-range wireless communication device attached to the main body, having a range of at least ten meters and designed to communicate with a supervision system;

a data processing unit attached to the main body and designed to send to the supervision system, via the long-range wireless communication device, information relating to the drilling grid and/or the drilling machine positioned in one of the positioning holes; and at least one short-range wireless communication device, wherein each short-range wireless communication device is attached to the main body and respectively associated with each positioning hole, each short-range wireless communication device having a range of at most five centimeters and designed for communicating with the drilling machine positioned in the associated positioning hole;

wherein the data processing unit is further designed to receive torque and/or thrust data from a cutting tool of the drilling machine, via the short-range wireless communication device associated with each positioning hole in which the drilling machine is positioned; and wherein the information sent to the supervision system via the long-range wireless communication device comprises the torque and/or thrust data.

2. The drilling grid according to claim 1, further comprising a memory attached to the main body in which memory an identifier of the drilling grid is stored, wherein the data processing unit is designed to detect a presence of the drilling machine and wherein the information sent to the supervision system comprises an indication of the presence of the drilling machine and the identifier.

3. The drilling grid according to claim 1, wherein the data processing unit is further designed to determine at least one advancement instant of the drilling operation and wherein the information sent to the supervision system via the long-range wireless communication device comprises the determined advancement instant or instants, wherein each advancement instant is one amongst: a positioning instant, a drilling start instant, a drilling end instant, and a separation instant.

4. A drilling installation comprising:

a drilling grid as claimed in claim 2; and the supervision system, the latter being designed to obtain, in response to receiving the presence of the drilling machine, a geolocation of the drilling grid, identified by the received identifier and to compare the obtained geolocation with a predefined geographical area where the drilling grid is to be located.

5. A drilling installation comprising:

a drilling grid as claimed in claim 1; and the supervision system, the latter being designed to estimate an end of life of the cutting tool from the received torque and/or thrust data, to determine a desired receipt date for a replacement cutting tool from the estimated end of life of the cutting tool and to send a command for the replacement cutting tool for the desired receipt date to a command management system.

6. A drilling installation comprising:

a drilling grid as claimed in claim 3; and the supervision system, the latter being designed to identify one or more blocking operations from the advancement instants received.

7. The drilling installation according to claim 6, wherein, in order to identify one or more blocking operations from the received advancement instants, the supervision system is further designed to compare at least one defined duration from at least one received advancement instant with a predefined duration.

* * * * *